Patented June 19, 1934

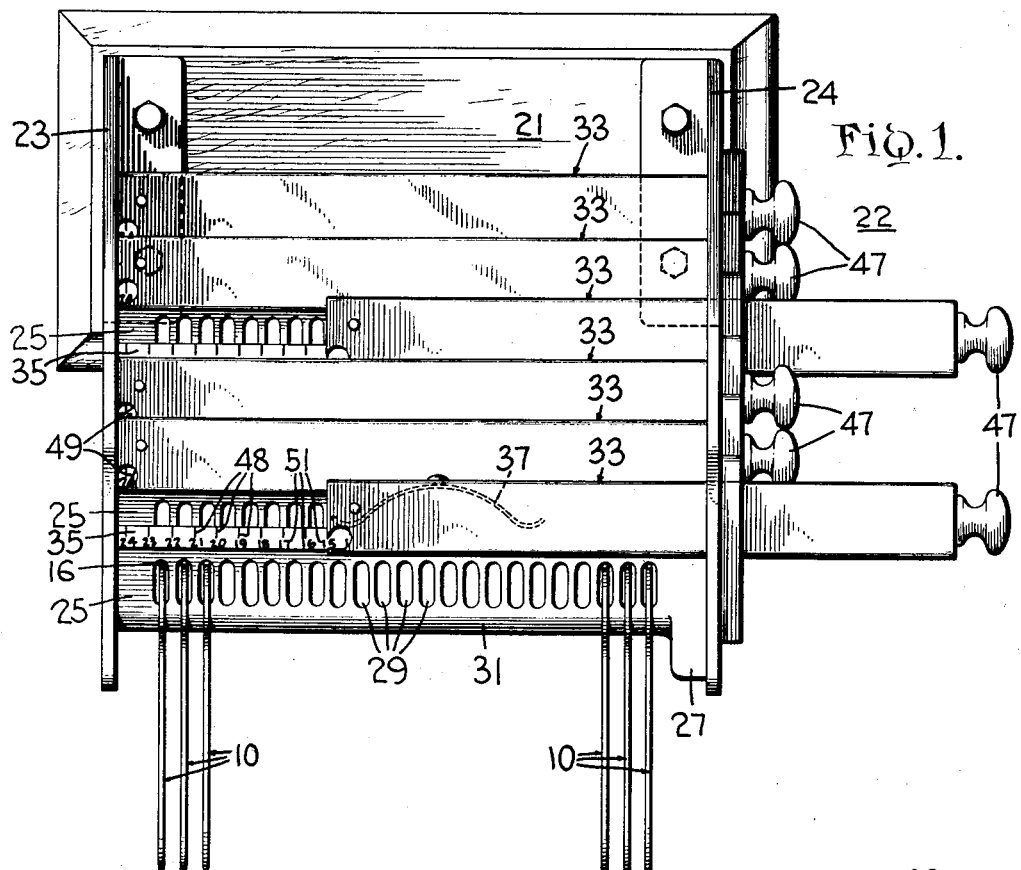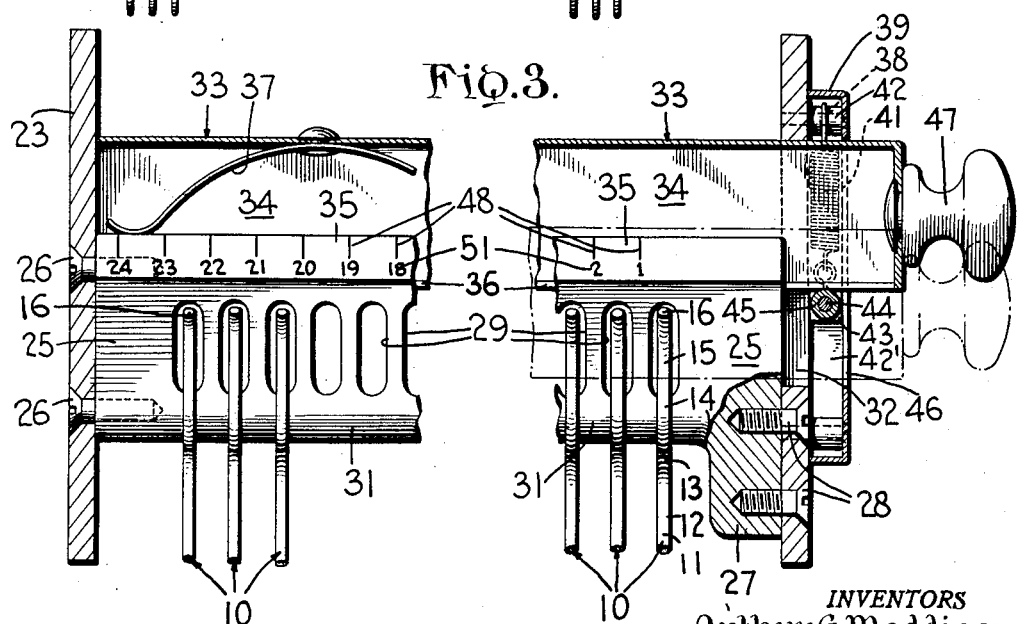

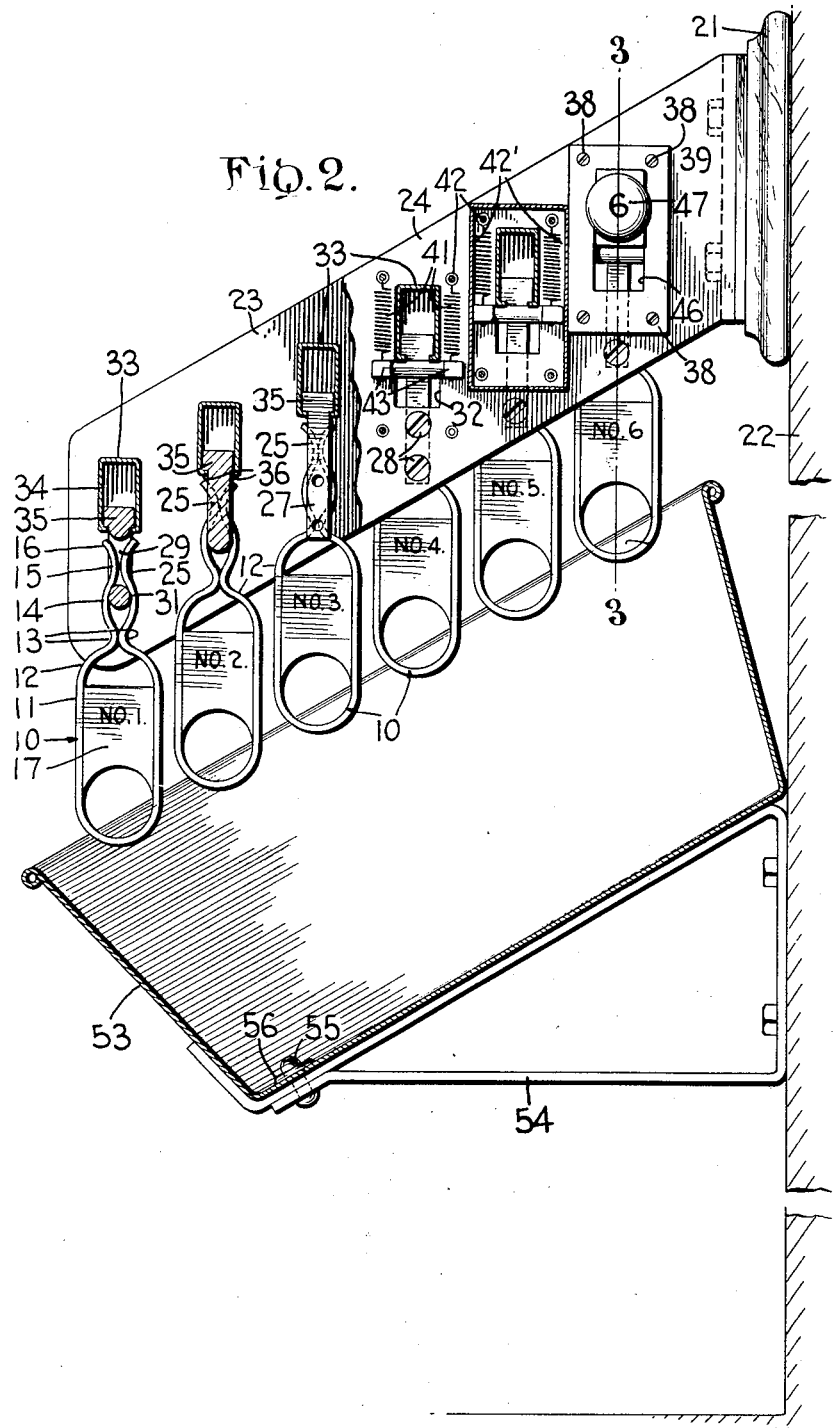

1,963,920

UNITED STATES PATENT OFFICE 1,963,920

APPARATUS AND METHOD FOR LUBRICATING VEHICLES

Arthur G. Maddigan and Raymon E. Rousseau, Buffalo, N. Y., assignors, by direct and mesne assignments, to Every Point Guaranteed Lubricating System, Inc., Buffalo, N. Y., a corporation of New York Application January 21, 1932, Serial No. 588,014

17 Claims. (Cl. 40—19.5)

Our invention has to do with apparatus for use in the lubrication of machines, motor vehicles and the like, and has especial application to devices adapted for use in the system of lubricating described in United States Letters Patent No. 1,833,513, granted on November 24th, 1931, to Barton A. Bean, Jr., and Arthur G. Maddigan, and our invention further relates to an improvement in the system described in said patent.

The apparatus there described includes a plurality of signals adapted to be removably attached to a machine to be lubricated, adjacent the points of lubrication thereon, and mechanism for supporting a large number of such signals and for dispensing any particular number of them. The system described includes the determination of the number of points on the machine which require lubrication; the removal of a corresponding number of signals from the supporting and dispensing mechanism, the attachment of the signals so removed to the machine, one adjacent each point to be lubricated to visibly indicate the same; the lubrication of such points as guided and indicated by the signals, and the removal of one signal as or after the point indicated by it is lubricated, whereby upon the removal of all the signals from the machine it is assured and indicated that every point thereon has been lubricated. The signals are then replaced in the supporting and dispensing mechanism, such replacement serving to additionally check the lubrication, since the returned signals, if all have been removed from the machine which has been lubricated, will completely fill the dispensing mechanism.

Machines, particularly motor vehicles, usually require different kinds of lubricants for their different parts. For example, in certain conventional automobiles, the transmission and differential, the universal shaft couplings, the fibre shaft couplings, the water pump, the steering mechanism, and the clutch, all require lubricants particularly adapted for such parts, if maximum lubrication is to be afforded them.

As the garage or service station attendant who lubricates such vehicles usually does not know what kinds of lubricant are required for all the different parts of different vehicles, charts have been developed to provide him with such information. However, as the charts cannot be conveniently carried by the attendant or operator while he is doing the actual work of lubrication, and as the lubricant fittings on the vehicle may all be of the same construction and appearance, regardless of the kind of lubricant that should be applied to them, the operator may, and very frequently does, apply the wrong kind or grade of lubricant to some parts of the vehicles, with the result that such parts wear unduly and often require replacement or repair.

The present invention comprehends apparatus including a plurality of sets of tags or signals to be attached to the lubrication fittings of a machine or vehicle, each set being of distinctive color or formation, or bearing indicia designating a particular kind of lubricant, and further comprehends a method of lubrication including steps of determining the particular number of points on the machine which require each kind of lubricant; of selecting a corresponding number of signals of each set of signals, of applying the signals to the points on the machine to be lubricated, placing each signal, indicating a particular kind of lubricant, on a point requiring such lubricant; of lubricating each point with the kind of lubricant indicated by the signal attached to it; and of removing the signals, one by one, as the points are lubricated. When all the signals are removed, so that the operator has the same number of signals with which he began, he is assured that each and every lubrication point on the machine has been attended.

In order to facilitate the selection of the proper number of signals of each set, the invention provides a supporting and dispensing mechanism for the signals. The mechanism includes a plurality of movable actuating members, corresponding in number to the number of sets of signals used, and each actuating member being operable to release from the mechanism any desired number of each set of signals, such number being predetermined from a chart or table applicable to the particular machine to be lubricated.

The operator is thus enabled to select readily the proper number of signals representing each kind of lubricant required, and having such proper number of them, can readily affix them to the corresponding fittings, which are likewise indicated by the chart or table. For example, if the operator have five signals indicating a very light oil, he can, by consulting the chart or table, determine where they are to be attached on the machine, and place them there. The system will thereby greatly encourage and facilitate the application of proper lubricant to each part of the machine.

These and other objects and advantages of the invention, including those inherent in the formation and arrangement of parts of the apparatus, will become apparent to those skilled in the art from the following description of one typical embodiment of the invention, illustrated in the accompanying drawings, wherein:

Fig. 1 is a front elevation of the supporting and dispensing mechanism with the signals carried thereby;

Fig. 2 is a vertical section taken at right angles to Fig. 1; and

Fig. 3 is an enlarged sectional view taken along line 3—3 of Fig. 2.

As shown in the drawings, the signals 10 may each comprise a spring wire 11 formed into a loop 12, the portions 13 of the wire being formed into proximity to complete the large loop, and extending into arcuate portions 14. Portions 15 of the wire, at the ends of the arcuate portions are in proximity. The wire terminates in portions 16 diverging from the adjacent portions 15. By reason of the resiliency of the wire 11, the arcuate portions may be spread apart to engage them about a grease or oil fitting, and, when so engaged, they will serve to retain the signal upon such fitting. The diverging portions 16 will function with camming action, when pressed against a fitting, to spread the arcuate portions apart. Extending across the loop is a web 17 which may be of distinctive color or bear distinguishing indicia. The webs preferably are formed to provide finger openings between them and portions of the loops in order that the signals may be conveniently handled by an operator.

The supporting and dispensing mechanism includes a base 21, adapted to be affixed to a wall 22 or other suitable support, and a pair of forwardly and downwardly extended arms 23, 24, affixed to the base. Paralleling the base and extending between the arms 23, 24 are a plurality of spaced supporting bars 25, secured to arm 23 by fasteners 26. The ends of the bars adjacent the arm 24 have depending portions 27 secured to arm 24 by fasteners 28. Each supporting bar has a plurality of recesses 29 spaced thereacross for receiving portions 15, 16, of signals 10. The parts 31 of the supporting bars, between the recesses and the lower edge of the bars, are preferably rounded, as shown in Fig. 2, to facilitate attachment and detachment of the signals.

The bars 25 may be of any suitable number, one for each set of signals or one for each different kind of lubricant. All signals of one color, distinctive shape, or bearing one kind of indicia may be applied to one rack bar. Thus, in the illustrated embodiment, signals labeled No. 1, No. 2, No. 3, No. 4, No. 5 and No. 6 are attached to the six supporting bars which have been illustrated, and represent six different lubricating mediums. If desired, a greater or lesser number of sets of signals and supporting bars may be provided.

Vertical guide slots, 32, one adjacent each bar 25, are formed in arm 24 for passing actuating or dispensing members 33. The latter are of generally inverted U cross-section with vertical sides 34 slidably engaging enlarged heads 35 on the supporting bars. Inturned flanges 36 at the bottoms of the sides 34 engage under the heads 35 to prevent upward displacement of the actuating members from the bars 25.

A leaf spring 37, attached to the upper wall or web of each member 33, acts against the upper edge of the supporting bar to prevent accidental movement of member 33 longitudinally of the bar, and to press the member 33 upwardly to cause flanges 36 to abut the bar head 35.

Secured by fasteners 38 to the outer face of arm 24 are flanged plates 39, housing the springs 41 which are anchored to sleeves 42, the latter being disposed about the fasteners 38. The vertical side flanges 42' of each plate cooperate with the plate and arm 24 to guide the blocks 43 which are connected to and carried by the springs 41, the blocks associated with the plate being connected by a pin 44. The pin mounts a roller 45 which engages under flanges 36 of the actuating member 33, to support the end of the member 33 that is adjacent the arm 24. The plates have openings 46 similar in shape and performing the same function as the openings 32 in the arm 24, namely, passing the members 33 and guiding them for longitudinal and vertical movements. Handles 47 for moving the members 33 longitudinally are provided at the ends thereof.

Graduation marks 48, one for each recess 29, occur on the heads 35 of the bars 25 and a number 51, or equivalent indicia, designating the number of recesses on each bar, counting from the arm 24, appears adjacent each graduation.

A sighting recess 49 is formed in the end of each member 33 opposite the handles 47, for viewing one graduation and number 51, the recesses 49 being so disposed that, in any longitudinal position of a member 33, the number 51 exposed will equal the number of recesses or signals occurring beneath the flanges 36.

In lubricating a vehicle according to the present system, the operator will first ascertain the number of different lubricants to be used and the number of points to which such lubricant is to be applied. This information may be obtained from a chart or table containing data relating to the particular vehicle to be lubricated. Assuming that four lubricants, as indicated by signals 1, 2, 4 and 6, are required, and that the numbers of points to be lubricated with the four lubricants are respectively 8, 6, 5, and 2, the operator will move the first member 33 to the position in which numeral 8 appears through opening 49; will move the second member until numeral 6 appears; the fourth until numeral 5 appears; and the sixth until number 2 appears. The numerals on each bar 25 will be visible, since, due to the inclination of arms 23 and 24, the bars at the rear are disposed above those at the front of the mechanism.

The operator will then press the first, second, fourth and sixth members 33 downwardly against the resistance of springs 37 and 41, whereupon the flanges 36 will engage 8 No. 1 signals, 6 No. 2 signals, 5 No. 4 signals, and 2 No. 6 signals, and will force them from the supporting bars. The members 33 will then return to their upper position shown in Fig. 2, so that the numbers appearing through openings 49 will indicate the number of signals of each set that have been dispensed.

The released signals are then attached to the machine to be lubricated, signals Nos. 1, 2, 4 and 6 being affixed to the lubricant fittings which require the particular lubricants indicated by such signals. In carrying out this step, the operator may consult a suitable chart, table or diagram. Lubricants are then applied to the fittings, which will be rendered more noticeable by the signals, a No. 1 lubricant being applied to each fitting bearing a No. 1 signal, a No. 2 lubricant to each fitting with a No. 2 signal, and so forth.

As each fitting is lubricated, the signal attached thereto is removed, and when the operator believes all the fittings have been attended to and all signals removed, the latter may be counted to determine whether or not they agree with the number originally dispensed from the supporting and dispensing mechanism, 8, 6, 5 and 2, respectively, which can be ascertained by reviewing the numbers appearing through recesses 49 in the actuating members 33. Or the operator may replace the signals on their respective supporting bars 35, and if the latter are then filled completely, he will have an indication that each part of the machine has been lubricated. In the event the checks, just referred to, indicate that one or more signals are missing, the operator will be apprised that the corresponding parts of the machine have not been lubricated, and may search for and find such parts and then lubricate them.

A basket or pan 53, removably supported by bracket means 54, may be disposed beneath the signal supporting and dispensing mechanism, for receiving the signals as they are released, and may be used for conveying such signals to the machine to be lubricated. The bracket means 54 may include a pin 55 extending through a small aperture 56 in the bottom of the basket, for preventing accidental displacement of the latter from the bracket means.

Because of the similarity in appearance of lubricants which may have materially different lubricating properties and characteristics, the lubricants are in conventional practice contained in grease guns, oil cans, or like dispensing devices of distinctive appearance, either of shape, color or bearing distinguishing indicia. In carrying out the present method, the distinguishing characteristics of color, shape or indicia on the signals may have counterparts on the lubricant dispensing devices. For example, a grease gun containing the lubricant indicated by a No. 6 signal, carried by the bar 25 having a releasing handle 47 or other part labeled No. 6, as shown at the right of Fig. 2, may bear a designation No. 6.

It will be understood that the present invention provides a simple and compact means for supporting and dispensing any desired number of signals indicating lubricants of several different characteristics; that the mechanism may be readily adjusted for releasing such desired number of signals and that after dispensing them, will indicate the number that have been dispensed; that the operator, by reason of having access to a number of signals of one set, indicating that such number of points on the machine are to be filled with one particular kind of lubricant, will be encouraged to apply the proper lubricant to each part of the machine.

It will be understood further, that the herein described embodiment of the inventive principles involved, is merely illustrative of such principles, and that the same may be applied to devices having other structural characteristics and to modified steps of lubricating procedure, all within the scope of this invention.

What we claim is:

1. In apparatus for checking the lubrication of a machine, a bar having an enlarged head and having a plurality of recesses extending therealong beneath said head, a plurality of signals carried by said bar, each signal having portions detachably engaged in one of the recesses and portions extending laterally beyond said recess and a member of inverted U-cross-section with inturned flanges, said member extending over said bar with the flanges normally abutting said head, whereby upon selective longitudinal movement of the member and then movement thereof to cause said flanges to abut and move the detachably engaged portions of the signals from the recesses, a selected number of said signals will be released from the bar.

2. In apparatus for checking the lubrication of a machine, a plurality of signals, a supporting bar having means spaced along one edge thereof for detachably supporting said signals, a member of substantially inverted U-cross-section normally straddling the other edge of the bar, whereby, upon movement of the member longitudinally along the bar to lie adjacent a selected number of signals and movement of the member transversely of the bar toward said first mentioned edge thereof to move the signals from said means, the selected number of signals will be engaged by said member and released from the bar.

3. In apparatus for checking the lubrication of a machine, a plurality of distinctive sets of signals, each signal being adapted to be attached to a point of lubrication on the machine, and each set of signals including portions distinguishing it from all the other signals and being indicative of a particular kind of lubricant, means for releasably supporting all of said signals, the signal supporting portion of each of said means being adapted to carry any of the sets of signals and means for releasing from the supporting means a selected number of signals of each set, said number corresponding to number of points on the machine to be lubricated with a particular lubricant.

4. In apparatus for checking the lubrication of a machine, a plurality of distinctive sets of signals, means for independently supporting each set of signals each signal being adapted to be attached to a point of lubrication on the machine, and each set of signals being indicative of a particular kind of lubricant, means on the first mentioned means for releasably supporting all of said signals, and means for each set of signals operable to release a selective number of signals of the set from the supporting means.

5. In apparatus for checking the lubrication of a machine, a plurality of distinctive sets of signals, each signal being adapted to be attached to a point of lubrication on the machine, each set of signals being indicative of a particular kind of lubricant, and means for each set for releasably supporting the signals thereof, whereby any selected number of signals may be removed from each or any supporting means, each of said means being adapted to support any of the sets of signals.

6. In apparatus for checking the lubrication of a machine, a plurality of distinctive sets of signals, each signal being adapted to be attached to a point of lubrication on the machine, and each set of signals being indicative of a particular kind of lubricant, means for each set for releasably supporting the signals thereof, whereby any selected number of signals may be removed from each or any supporting means, each of said means being adapted to support any of the sets of signals and means for visibly indicating the number of signals that have been removed therefrom.

7. In apparatus for checking the lubrication of a machine, a signal for attachment to the machine adjacent a point of lubrication thereof for visibly indicating such point, comprising a wire formed into a substantial loop with the terminal portions of the wire formed to comprise releasable attaching means, and a web extending across the loop, said web being cut away adjacent a portion of the wire of the loop to provide a finger hold.

8. In apparatus for checking the lubrication of a machine, a signal for attachment to a lubrication fitting on the machine, comprising a wire of substantially loop form, the terminal portions of the wire being juxtaposed and each of substantially arcuate form to engage on opposite sides of a fitting, and a web extending across the loop and marked to distinctively indicate the kind of lubricant to be applied to the fitting.

9. In apparatus for checking the lubrication of a machine, a plurality of signals, a supporting bar having means spaced along one edge thereof for detachably supporting said signals, a member of substantially inverted U-cross-section normally straddling the other edge of the bar, whereby, upon movement of the member longitudinally along the bar to lie adjacent a selected number of signals and movement of the member transversely of the bar toward said first mentioned edge thereof, the selected number of signals will be engaged by said member and moved to release them from the bar, and means operable by and upon longitudinal movement of the member for indicating the number of signals that will be released upon said transverse movement of the member.

10. In apparatus for checking the lubrication of a machine, a plurality of signals, a supporting bar having means spaced along one edge thereof for detachably supporting said signals, a member of substantially inverted U-cross-section normally straddling the other edge of the bar, whereby, upon movement of the member longitudinally along the bar to lie adjacent a selected number of signals and movement of the member transversely of the bar toward said first mentioned edge thereof, the selected number of signals will be engaged by said member and moved to release them from the bar, said bar having graduations therealong, one graduation for each signal, and said member having an opening therein in alignment with the graduations, whereby in any selected position of longitudinal movement of the member, a graduation, indicative of the number of signals to be released upon transverse movement of the member, will be visible through the opening.

11. In apparatus of the class described, a supporting arm and a signal supporting bar extending substantially normal thereto from one face thereof, said arm having a guide opening therethrough in alignment with the upper portion of the bar, a plate having vertical flanges spacing it from the other face of the arm, said plate having an opening therein in horizontal alignment with the first mentioned opening, a signal releasing member for horizontal movement along said bar, said member extending through said openings and being guided therealong for vertical and horizontal movements, a cross-head mounted between the plate and arm and guided for vertical movements by the flanges of the plate, a roller carried by the cross-head and adapted to engage the bottom edge of said releasing member, and a pair of vertically disposed springs one on each side of the roller connected to the cross-head and arm for urging the releasing member upwardly.

12. In apparatus of the class described, a supporting arm and a signal supporting bar extending normal thereto from one face thereof, said bar being of angular cross-section with a horizontal part overhanging a vertical part, said arm having an opening therethrough in horizontal alignment with the upper portion of the bar, a signal releasing member extending through said opening and guided thereby for horizontal movement along the bar and vertical movement transversely of the bar, said member having a flange adapted to abut the horizontal part of the bar to limit upward movement of the member, a roller extending beneath said member, and spring means connecting said roller and arm for pressing the roller and member upwardly to cause said flange to abut the horizontal part of the bar.

13. In a device of the class described, a member having a vertically elongated horizontal opening therein, a signal release member guided for vertical and horizontal movement by the side walls of said opening, and resilient means acting between said members for normally retaining said release member in an upper portion of the opening.

14. In a device of the class described, a member having a vertically elongated opening extending horizontally therethrough, vertical guide means carried by said member, a roller assembly guided by said vertical guide member, an actuating member extending through said opening and supported by said roller assembly for movement in a horizontal direction, and spring means acting between the roller assembly and said actuating member for normally retaining the actuating member in an upper portion of said opening.

15. In apparatus for checking the lubrication of a machine, a bar of substantially T-cross-section having a plurality of signal supporting means spaced therealong adjacent the lower edge, a signal releasably engaged with each of said means, a member of substantially inverted U-cross-section straddling said bar, said member having inturned flanges at the lower edge thereof for abutment with the head of the T-bar, and for releasing the signals upon downward movement of the member, said member being selectively movable longitudinally of the bar whereby upon downward movement of the member any selected number of signals may be released, and spring means between the upper edge of the bar and the member for normally retaining the flanges of the latter in abutment with the head of the T-bar.

16. In apparatus for lubricating a machine, a plurality of signals each adapted for attachment to a point of lubrication on said machine, a plurality of parallel supporting members having means along the lower edge thereof for releasably supporting a number of said signals, a release member movable along each supporting member to overlie a selected number of signals thereon and movable downwardly to release such selected number of signals from the supporting member, one member of each pair of supporting and release members having graduations adjacent the upper edge thereof and the other of each pair of said members having an indicator thereon for indicating the number of signals that will be released upon downward movement of the release member, and means for assembling the several supporting members as a unit, the supporting and release members at the front of the apparatus being lower than those at the rear whereby the indicator and graduations on all of said members are rendered visible.

17. In apparatus for checking the lubrication of a machine, a bar having a laterally extending flange along one edge and having a plurality of signal supporting means spaced therealong adjacent the other edge, a signal releasably engaged with each of said means, a member of substantially inverted U cross-section straddling said bar, said member having an inturned flange at the lower edge thereof for abutment with said flange, and spring means acting between the upper edge of the bar and the member for normally retaining the flange of the latter in abutment with the flange of said bar, said member being movable both downwardly and selectively along the bar, whereby said member may engage and release any selected number of signals from the bar.

ARTHUR G. MADDIGAN.
RAYMON E. ROUSSEAU.